(12) United States Patent
Davidovici

(10) Patent No.: US 9,781,944 B2
(45) Date of Patent: Oct. 10, 2017

(54) LOLLIPOP APPARATUS AND METHOD

(71) Applicant: SUGAR FACTORY, LLC, Las Vegas, NV (US)

(72) Inventor: Steve Davidovici, Las Vegas, NV (US)

(73) Assignee: SUGAR FACTORY, LLC, Las Vegas, NV (US)

( * ) Notice: Subject to any disclaimer, the term of this patent is extended or adjusted under 35 U.S.C. 154(b) by 0 days.

(21) Appl. No.: 14/807,626

(22) Filed: Jul. 23, 2015

(65) Prior Publication Data
US 2015/0327570 A1 Nov. 19, 2015

Related U.S. Application Data

(63) Continuation of application No. 12/262,507, filed on Oct. 31, 2008, now abandoned.

(51) Int. Cl.
*A23G 3/56* (2006.01)

(52) U.S. Cl.
CPC .............. *A23G 3/56* (2013.01); *A23G 3/563* (2013.01); *A23V 2002/00* (2013.01); *Y10T 428/216* (2015.01)

(58) Field of Classification Search
CPC .................................. A23G 3/56; A23G 3/563
USPC .................................................. 426/104, 134
See application file for complete search history.

(56) References Cited

U.S. PATENT DOCUMENTS

| 1,575,625 | A | 3/1926 | Dibelka |
| 1,889,118 | A | 11/1932 | Andrews |
| 2,166,568 | A | 7/1939 | Kuhlke |
| 3,422,697 | A | 1/1969 | Brown et al. |
| 3,481,458 | A | 12/1969 | Mayeaux |
| 3,549,465 | A | 12/1970 | Skelley |
| 3,615,596 | A | 10/1971 | Petti et al. |
| 3,943,928 | A | * 3/1976 | Lariccia ............... A61K 9/0056 604/57 |
| 4,914,748 | A | 4/1990 | Schlotter et al. |

(Continued)

FOREIGN PATENT DOCUMENTS

| CH | 610746 | * 5/1979 | |
| FR | 2 688 396 | * 9/1993 | ............. A47G 21/04 |

(Continued)

OTHER PUBLICATIONS

Legoy et al. Translation of FR 2688396.*

(Continued)

*Primary Examiner* — Erik Kashnikow
*Assistant Examiner* — C Smith
(74) *Attorney, Agent, or Firm* — Procopio Cory Hargreaves and Savitch LLP; Pattric J. Rawlins

(57) ABSTRACT

A lollipop ball is formed to a lollipop ball engagement mechanism and the lollipop ball engagement mechanism extends outward from the lollipop ball to releasably engage a proximal end of a lollipop stick. Alternatively, a lollipop ball is formed to a lollipop ball engagement mechanism that defines a cavity inside the sphere of the lollipop ball and the proximal end of the lollipop stick releasably engages the cavity located in the interior of the lollipop. Alternatively, the lollipop itself can be formed to define the cavity such that no lollipop ball engagement mechanism is required to releasably engage the proximal end of the lollipop stick. The lollipop stick can also include one or more design elements.

7 Claims, 2 Drawing Sheets

(56) References Cited

U.S. PATENT DOCUMENTS

| | | | |
|---|---|---|---|
| 5,209,692 A | 5/1993 | Coleman et al. | |
| 5,536,054 A | 7/1996 | Liaw | |
| 5,690,535 A | 11/1997 | Coleman et al. | |
| 5,702,742 A | 12/1997 | Jones et al. | |
| 5,824,334 A * | 10/1998 | Stanley | A23G 3/368 424/434 |
| 6,074,266 A | 6/2000 | Zak | |
| 6,090,420 A | 7/2000 | Coleman et al. | |
| 6,309,683 B1 | 10/2001 | Coleman et al. | |
| 6,471,364 B1 | 10/2002 | Plante | |
| 6,565,899 B1 * | 5/2003 | Cecere | A23G 3/50 426/132 |
| 6,572,244 B1 | 6/2003 | Clark | |
| 6,619,816 B1 | 9/2003 | Johnson | |
| 6,659,619 B2 | 12/2003 | Gordon | |
| 6,730,339 B2 | 5/2004 | Chan | |
| D491,336 S | 6/2004 | Cecere | |
| 7,014,877 B2 | 3/2006 | Lobl | |
| 7,473,155 B1 * | 1/2009 | Klundt | A23G 3/563 426/104 |
| 7,775,848 B1 * | 8/2010 | Auerbach | A23G 3/563 446/73 |
| 2002/0058090 A1 | 5/2002 | Siddons | |
| 2002/0126507 A1 | 9/2002 | Gordon | |
| 2003/0035865 A1 * | 2/2003 | Chan | A23G 3/563 426/110 |
| 2003/0077362 A1 | 4/2003 | Panhorst et al. | |
| 2003/0087007 A1 | 5/2003 | Summers | |
| 2004/0170020 A1 | 9/2004 | Johnson | |
| 2005/0095949 A1 | 5/2005 | Fernandez | |
| 2005/0180125 A1 | 8/2005 | Yu | |
| 2006/0040019 A1 * | 2/2006 | Cecere | A23G 3/563 426/85 |
| 2006/0107781 A1 | 5/2006 | Yao | |
| 2006/0286283 A1 | 12/2006 | Yoon | |
| 2008/0233247 A1 | 9/2008 | Fernandez | |
| 2009/0286448 A1 | 11/2009 | Lopez | |

FOREIGN PATENT DOCUMENTS

| | | | | |
|---|---|---|---|---|
| JP | 5-153911 | * | 6/1993 | A23G 3/00 |
| JP | 05-153911 | | 6/1993 | |
| KR | 20-0376387 | | 3/2005 | |

OTHER PUBLICATIONS

Ogawa et al., Translation of JP 05153911.*
Office Action dated Jul. 27, 2012 for related Chinese Patent Application No. 200980143371.2 and corresponding English translation in 19 pages.
Office Action dated Jun. 25, 2013 for related Chinese Patent Application No. 200980143371.2 and corresponding English translation in 17 pages.
Office Action dated Mar. 17, 2014 for related Chinese Patent Application No. 200980143371.2 and corresponding English translation in 14 pages.
Office Action dated Dec. 8, 2014 for related Chinese Patent Application No. 200980143371.2 and corresponding English translation in 16 pages.
Office Action dated Jul. 10, 2015 for related Korean Patent Application No. 10-2011-7012211 and corresponding English translation, in 11 pages.
Office Action dated Mar. 18, 2016 for related Korean Patent Application No. 10-2011-7012211 and corresponding English translation, in 5 pages.
Extended European Search Report for EP09823950.2, dated Oct. 24, 2012, 6 pages.
International Search Report and Written Opinion from PCT/US2009/033762 dated Nov. 27, 2009.
"The Spin Pop turns 10: a look at how this spinning lollipop changed the candy category. (Marketing and Merchandising)", Confectioner, May 1, 2003.

* cited by examiner

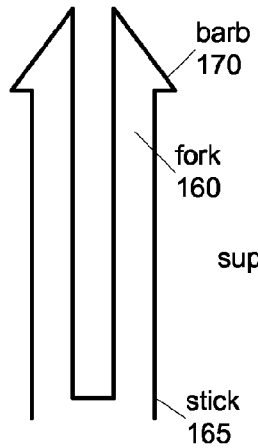
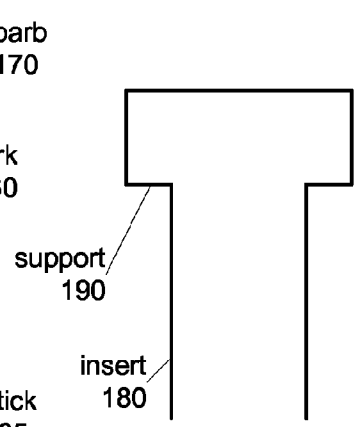
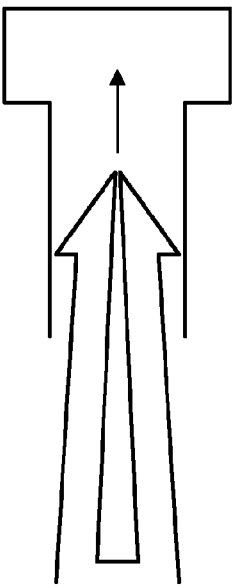
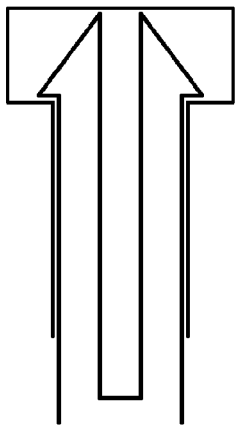
FIG. 5A  FIG. 5B  FIG. 5C  FIG. 5D
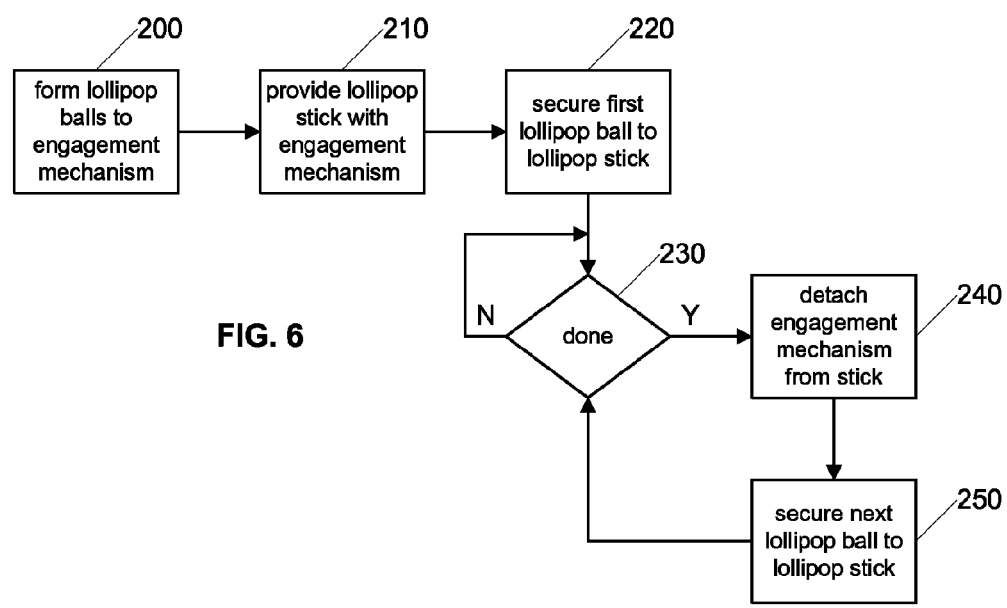
FIG. 6

LOLLIPOP APPARATUS AND METHOD

RELATED APPLICATION

The present application is a continuation of U.S. patent application Ser. No. 12/262,507 filed 31 Oct. 2008, which is incorporated herein by reference in its entirety.

BACKGROUND

Field of the Invention

The present invention generally relates to lollipops and the manufacturing of lollipops.

Related Art

Conventional candy products such as lollipops have broad appeal to consumers. However, conventional candy products are typically consumed while the wrapping and other accoutrements are discarded. For example, the wrapper and stick of a lollipop is discarded after the lollipop is consumed. Additionally, conventional candy products suffer from a lack of association with high fashion and desirable personal accessories. Therefore, what is needed is a new lollipop that includes re-usable components and has desirable fashion and personal accessory elements.

SUMMARY

Accordingly, described herein is a consumable apparatus that includes candy or other edible material (referred to herein as a "lollipop") mounted on an elongated handle (referred to herein as a "stick"). In a first embodiment, the lollipop is formed to a threaded mount and the threaded mount is configured to releasably engage a threaded cavity on the stick. In a second embodiment, the lollipop is formed to a threaded insert that defines a threaded cavity and the stick has a proximal end with threads that are configured to releasably engage the threaded cavity within the lollipop. Alternatively, the lollipop itself can be formed to define the threaded cavity such that no threaded insert is required to releasably engage the threaded stick. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 5A-5D are block diagrams illustrating an example alternative engagement mechanism for securing a lollipop ball to a lollipop stick according to an embodiment of the present invention; and FIG. 6 is a flow diagram illustrating an example process for using a lollipop according to an embodiment of the present invention.

DETAILED DESCRIPTION

Certain embodiments as disclosed herein provide for a threaded lollipop that includes a reusable stick that screws into a threaded cavity within the lollipop or into a threaded cavity defined by an insert about which the lollipop is formed. An alternative embodiment provides for a threaded mount about which the lollipop is formed where the threaded mount extends out from the lollipop and screws into a threaded cavity in the stick. A cap is also provided with an optional hole for use with a lollipop ball alone or for use with a lollipop ball that is engaged with a lollipop stick.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
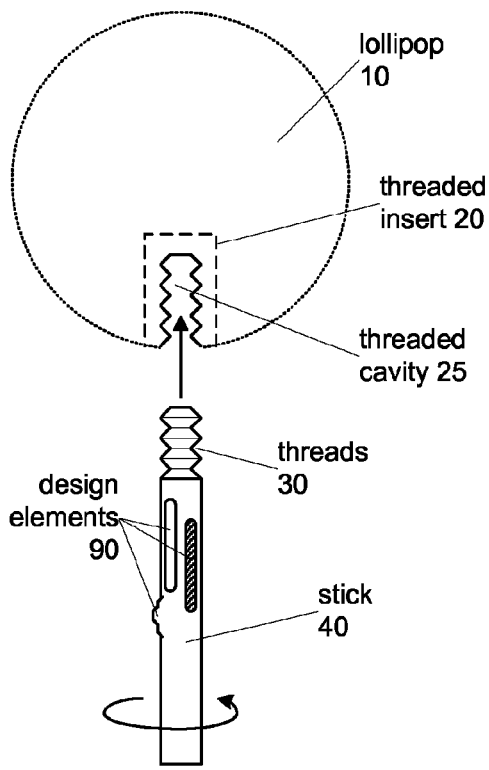
FIG. 1 is a block diagram illustrating a threaded lollipop with decorative stick according to an embodiment of the present invention.

FIG. 1 is a block diagram illustrating a threaded lollipop 10 with decorative stick 40 according to an embodiment of the present invention. In the illustrated embodiment, the lollipop 10 ball is formed around a threaded insert 20 during manufacture of the lollipop 10 ball. The threaded insert 20 is one embodiment of an engagement mechanism for the lollipop. In one embodiment, the lollipop 10 ball is a thirty two (32) gram ball.

The threaded insert 20 can be made of plastic or paper or any other material capable of defining a threaded cavity 25. In one embodiment, the threaded insert 20 is made from an edible material. The function of the threaded insert 20 is twofold. First, the insert defines a base upon which the lollipop 10 ball is formed. In one embodiment, the end of the threaded insert 20 that is near the perimeter edge of the lollipop 10 ball is substantially flush or slightly recessed into the interior of the lollipop 10 ball. In this fashion the surface of the lollipop 10 ball is primarily spherical with a recess where the threaded cavity 25 is located.

In an alternative embodiment, the threaded cavity 25 may be defined by the lollipop 10 ball itself. In such an embodiment, when the lollipop 10 ball is formed, the threaded cavity 25 is defined such that the lollipop 10 ball hardens and the threaded cavity 25 remains.

The threaded cavity 25 is sized and shaped to snugly receive threads 30 that are provided on one end of a lollipop stick 40. The threads 30 of the stick 40 are twisted into the threaded cavity 25 defined in the lollipop 10 ball in order to releasably secure the lollipop 10 ball to the stick 40.

The stick 40 may also be decorated with design elements 90 to add to the overall appeal of the lollipop 10 and the stick 40. The design elements 90 on the stick 40 may include various prints, designs, wraps, and attachments. In one embodiment, the stick 40 is bejeweled with 2 mm to 5 mm crystals that are affixed to the outer surface of the stick. The crystals can advantageously be different colors in order to provide the desired look for the lollipop stick 40. Customizable sticks may also be made available to consumers via a custom order interface, e.g., via an operator on a telephone or via a website.

Figure 2:
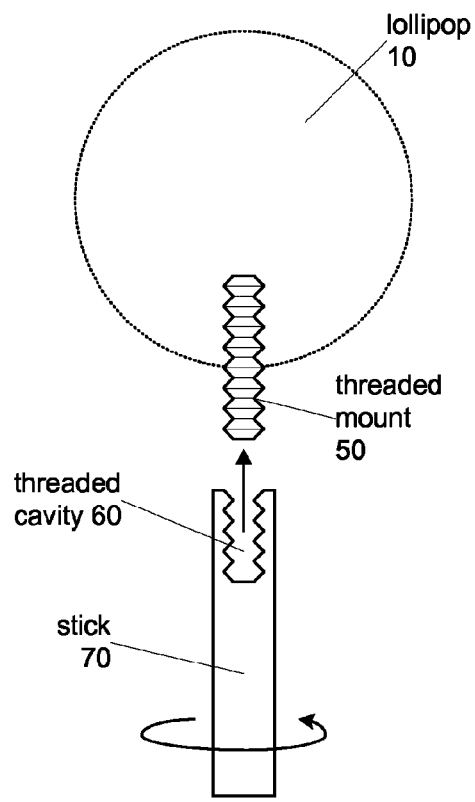
FIG. 2 is a block diagram illustrating a threaded lollipop according to an embodiment of the present invention.

FIG. 2 is a block diagram illustrating a threaded lollipop 10 according to an embodiment of the present invention. In the illustrated embodiment, the lollipop 10 ball is formed around a threaded mount 20 during manufacture of the lollipop 10 ball. The threaded mount 20 extends into the interior of the lollipop 10 ball and also extends beyond the exterior surface of the lollipop 10 ball. The portion of the threaded mount 50 that extends beyond the exterior surface of the lollipop ball 10 (i.e., the exterior portion) is threaded. The exterior portion may also be designed to use an alternative engagement mechanism such as the fork and barb previously described with respect to FIG. 1.

The threaded mount or lollipop ball engagement mechanism 50 has a first portion that extends into the interior of the lollipop ball 10 (i.e., the interior portion) and may or may not be threaded, and a second portion that extends outward from a proximal surface portion of the lollipop ball which faces the stick 70, as seen in FIG. 2. The interior or first portion of mount or engagement mechanism 50 is preferably optimally shaped to provide a secure mount upon which the lollipop 10 ball may be formed during manufacture of the lollipop 10 ball. As illustrated in FIG. 2, the first portion of engagement mechanism 50 has a length which is less than half the length of a central axis of the lollipop ball 10 extending from the proximal surface portion to an opposing distal surface portion of the lollipop ball.

The exterior portion of the threaded mount 20 is sized and shaped to snugly fit into the threaded cavity 60 that is defined by one end of the lollipop stick 70. When the threaded mount 20 is snugly fit into the threaded cavity 60, the lollipop 10 ball is releasably secured to the stick 70. As previously described, the means for engaging/securing the lollipop 10 ball to the stick 70 may include threads, forks and barbs, or alternative means as will be understood by those skilled in the art. In the illustrated embodiment, the threaded mount 50 is twisted into the threaded cavity 60 that is defined in one end of the lollipop stick 70 in order to releasably secure the lollipop 10 ball to the stick 70. Although not shown, stick 70 may also include design elements 90 as previously described with respect to FIG. 1.

Figure 3:
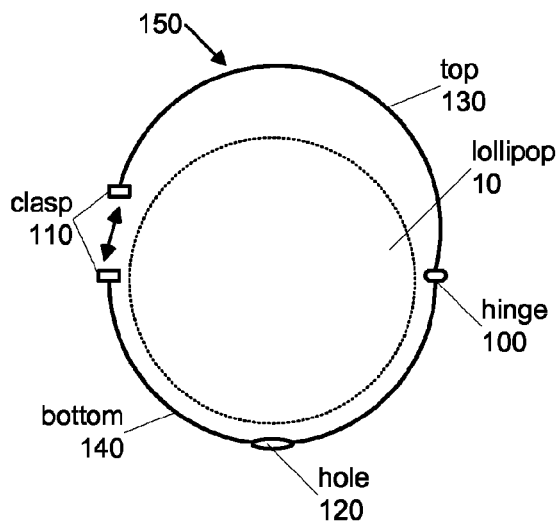
FIG. 3 is a block diagram illustrating a hinged container for a threaded lollipop according to an embodiment of the present invention.

FIG. 3 is a block diagram illustrating a hinged container 150 for a threaded lollipop according to an embodiment of the present invention. In the illustrated embodiment, the container 150 includes a top 130 portion and a bottom 140 portion that are pivotably connected by a hinge 100. The container 150 surrounds a lollipop 10 ball and is configured to securely close by a clasp 110 means. When closed, the container 150 defines a spherical compartment in which the lollipop 10 ball can be stored. In one embodiment, an optional hole 120 is provided in a portion of the surface of the container 150 so that the lollipop stick 40 may pass through the hole 120 or so that the threaded mount 50 may pass through the hole 120.

Figure 4:
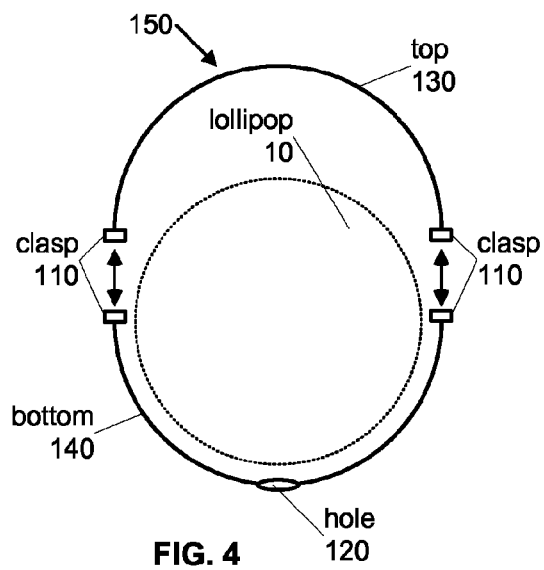
FIG. 4 is a block diagram illustrating a two piece container for a threaded lollipop according to an embodiment of the present invention.

FIG. 4 is a block diagram illustrating a two piece container 150 for a threaded lollipop according to an embodiment of the present invention. In the illustrated embodiment, the container 150 includes a top 130 portion and a separate bottom 140 portion that together define a spherical compartment in which the lollipop 10 ball can be stored. The top 130 portion and bottom 140 portion are each configured with one or more matching clasps 110 that engage to securely hold the top 130 portion to the bottom 140 portion to define the spherical compartment. In one embodiment, an optional hole 120 is provided in a portion of the surface of the container 150 so that the lollipop stick 40 may pass through the hole 120 or so that the threaded mount 50 may pass through the hole 120.

FIGS. 5A-5D are block diagrams illustrating an example alternative engagement mechanism for releasably securing a lollipop ball to a lollipop stick according to an embodiment of the present invention. In the illustrated embodiment, a lollipop stick 150 is provided that has two or more forks 160 and each fork 160 has a barb 170 at its end. A corresponding insert 180 is also provided that includes a support 190. The stick 150 is releasably secured to the insert 180 by compressing the two or more forks 160 together and sliding the forks 160 into the insert 180. When the forks 160 are released, the barbs 170 engage the supports 190 to secure the lollipop ball (not shown) to the lollipop stick 150. The lollipop stick 150 may be detached from the insert 180 by compressing the two or more forks 160 and pulling the stick away from the insert 180. An advantage of this type of engagement mechanism is that it allows the lollipop ball to freely rotate about the lollipop stick 150 while remaining securely fastened to the lollipop stick 150.

FIG. 6 is a flow diagram illustrating an example process for using a lollipop according to an embodiment of the present invention. The steps in the illustrated method can be performed in the order shown or in an alternative order. Initially, in step 200 one ore more lollipop balls are formed about an engagement mechanism. The engagement mechanism can be a female threaded cavity or a male threaded mount. The engagement mechanism may also be support platforms for receiving corresponding barbs on the lollipop stick.

Next, in step 210 the lollipop stick is provided with a corresponding engagement mechanism. The engagement mechanism can be a female threaded cavity or male threads. The engagement mechanism may also be two or more forks with barbs such that the forks can be compressed together to slide into an insert where the barbs can engage the support platforms. The lollipop stick can also be decorated by wrapping the stick in a printed material, by printing directly onto the stick, by affixing items such as decorative crystals, jewels, and the like to the stick.

Once the corresponding engagement mechanisms are in place, in step 220 the engagement mechanism of a first lollipop ball is releasably secured to the lollipop stick. This may be accomplished by screwing the lollipop stick into the engagement mechanism of the first lollipop ball, or by compressing the lollipop stick and sliding it into the engagement mechanism of the first lollipop ball. Once the lollipop ball is consumed or is otherwise done, as determined in step 230, the engagement mechanism and the lollipop stick are detached in step 240. Then, in step 250 the engagement mechanism of a next lollipop ball is secured to the lollipop stick and the process continues with as many additional lollipop balls as desired.

A significant advantage of the described lollipop ball with engagement mechanism and corresponding lollipop stick with engagement mechanism is that the lollipop stick can be reused by a consumer. Furthermore, the reusability of the lollipop stick causes the lollipop stick to become a fashion accessory that can be attractively decorated. Another significant advantage of the reusable nature of the described lollipop ball with engagement mechanism and corresponding lollipop stick with engagement mechanism is the reduction in litter and paper product consumption that is associated with conventional lollipops that require single use discardable sticks.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method of using a lollipop, comprising:
    releasably securing a first lollipop head engagement mechanism to a mating engagement mechanism at a proximal end of a lollipop stick to create a first lollipop, wherein the first lollipop head engagement mechanism is divided into exactly two portions and a first lollipop head of edible material is formed entirely around a first of said two portions of the first lollipop head engagement mechanism and a second of said two portions of the first lollipop head engagement mechanism which extends from the lollipop head is concealed by the lollipop stick when the first lollipop head engagement mechanism is secured to the mating engagement mechanism;
    consuming the first lollipop head while holding the lollipop stick;
    detaching the first lollipop head engagement mechanism from the mating engagement mechanism on the lollipop stick; and
    releasably securing a second lollipop head engagement mechanism to the mating engagement mechanism at the proximal end of the lollipop stick to create a second lollipop, wherein the second lollipop head engagement mechanism is divided into exactly two portions and a second lollipop head of edible material is formed entirely around a first of said two portions of the second lollipop head engagement mechanism and a second of said two portions of the second lollipop head engagement mechanism which extends from the second lollipop head is concealed by the lollipop stick when the second lollipop head engagement mechanism is secured to the mating engagement mechanism.

2. A method for using a lollipop, comprising:
    providing a lollipop ball engagement mechanism divided into exactly two portions, wherein a first of said two portions is shaped to provide a secure mount upon which a lollipop ball may be formed during manufacture of the lollipop ball, the first of said two portions configured to engage a lollipop ball, and wherein a second of said two portions extends outward from the lollipop ball and includes male threads configured to engage a female threaded portion of a lollipop stick;
    forming a lollipop ball about the first of said two portions of the lollipop ball engagement mechanism, wherein the first of said two portions is positioned entirely inside the lollipop ball;
    providing a lollipop stick having a proximal end and a distal end wherein the proximal end comprises a female threaded portion shaped to releasably engage the male threads of the second of said two portions of the lollipop ball engagement mechanism and conceal the second of said two portions of the lollipop ball engagement mechanism, wherein the lollipop stick is configured for gripping by a user while consuming the lollipop ball.

3. A lollipop comprising:
    a lollipop ball having an outer surface, a proximal surface portion, a distal surface portion opposite to the first portion and a central axis extending between the proximal and distal surface portions;
    a lollipop stick having a proximal end facing the proximal surface portion of the outer surface of the lollipop ball and a distal end and having a gripping portion which is gripped by a user while consuming the lollipop ball, the proximal end of the stick having a cavity which includes an internally threaded section;
    a lollipop ball engagement mechanism having an exterior surface, the lollipop ball engagement mechanism divided into exactly two portions, wherein a first of said two portions engages the lollipop ball and is located entirely within the lollipop ball and a second of said two portions extends outward from the proximal surface portion of the lollipop ball and includes an externally threaded section;
    wherein the lollipop ball is formed around the first of said two portions of the exterior surface of the lollipop ball engagement mechanism; and
    the internally threaded section of the lollipop stick is releasably engaged with the externally threaded section of the lollipop ball engagement mechanism and the second of said two portions of the lollipop ball engagement mechanism is concealed within the cavity at the proximal end of the lollipop stick.

4. The lollipop of claim 3, wherein the lollipop ball is at least 24 grams.

5. The lollipop of claim 3, wherein the lollipop ball is at least 32 grams.

6. The lollipop of claim 3, wherein the lollipop stick has an outer surface which includes decorative design elements affixed to the outer surface of the stick.

7. The lollipop of claim 3, wherein the central axis of the lollipop ball has a first length, and the first of said two portions of the lollipop ball engagement mechanism has a second length which is less than half the first length.

* * * * *